Figure 1:
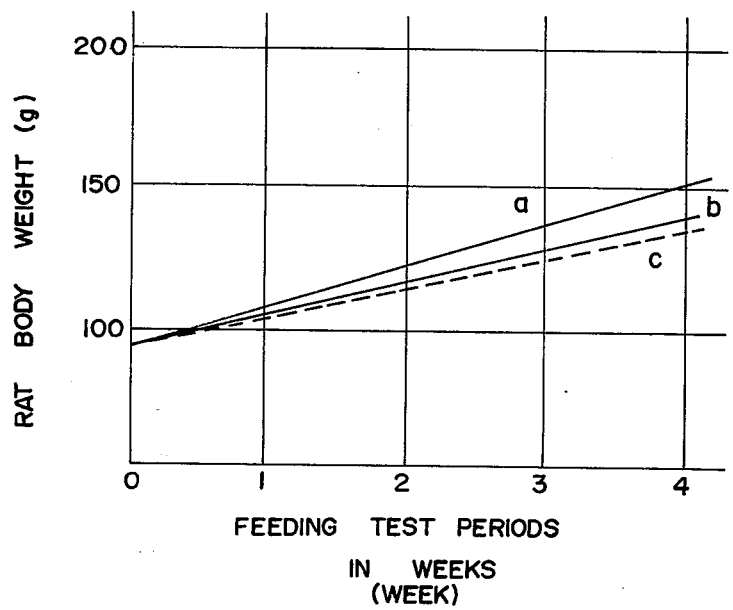
Figure 2:
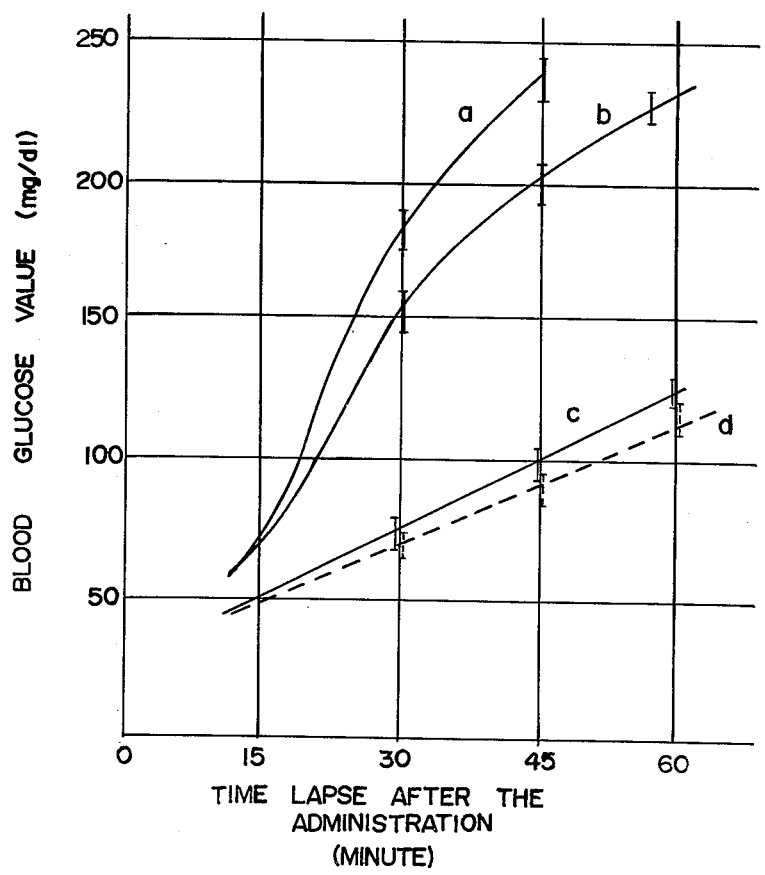

United States Patent [19]

Sugimoto

[11] 3,957,976

[45] May 18, 1976

[54] METHODS FOR REDUCING CHOLESTEROL LEVELS

[75] Inventor: Kaname Sugimoto, Okayama, Japan

[73] Assignee: Kabushiki-Kaisha Hayashibara Neibutsukagaku kenkyujo, Okayama, Japan

[22] Filed: Sept. 20, 1973

[21] Appl. No.: 399,096

[30] Foreign Application Priority Data

Sept. 29, 1972 Japan.............................. 47-97198

[52] U.S. Cl. .............................................. 424/180
[51] Int. Cl.² .......................................... A61K 31/70
[58] Field of Search .................................... 424/180

[56] References Cited

FOREIGN PATENTS OR APPLICATIONS 1,253,300  11/1971  United Kingdom

Primary Examiner—Sam Rosen
Attorney, Agent, or Firm—Browdy and Neimark

[57] ABSTRACT

The present invention relates to a process for the preparation of sucrose-containing sweeteners or sucrose-containing foods and drinks, which is characterized in adding maltitol and/or lactitol to the ingredient sucrose to reduce the calorie value of such products and in the fact that intake of such products will inhibit increments of blood and liver saccharides and cholesterol levels.

6 Claims, 3 Drawing Figures

METHODS FOR REDUCING CHOLESTEROL LEVELS

A sharp increase in sugar consumption is noted in each country recently and the sugar consumpion per capita is said to represent the civilization standard of the country. However, on the other hand the adverse effects caused by the so-called "sugar harms" are beginning to receive attention. More particularly, evidence of the pathogenity of excessive intakes of sucrose in causing obesity and adult or senile diseases have been provided by many investigators.

With the objectives to overcome and to solve such disadvantages, the present inventors developed low-calorie sweeteners such as maltitol and lactitol. The inventors further studied the effects of maltitol, lactitol and other sugars with rats. The findings were that the addition of maltitol and/or lactitol to sucrose or sucrose-containing diets inhibits the blood sugar levels of the animals as well as inhibiting the increase in liver glycogen. The findings apparently show the inhibiting effects of such addition on the absorbance of sucrose in vivo. Furthermore maltitol and/or lactitol administration inhibited the increase of cholesterol levels in blood and liver. Such effects are phenomena which are not found in mono-saccharides, such as glucose and fructose, and provide an entirely new information on sucrose. Based on the above findings of their studies, the present inventors recognized the potential of providing sweeteners effective in preventing adult or senile diseases and foods and drinks in which the sweetener is incorporated with the same purpose.

It is the objective of the present invention to provide new sweeteners in which sucrose is its main component and sucrose-containing foods and drinks by adding to the sweetener, foods or drinks maltitol and/or lactitol, to impart to the sweetener, food and drink products a decent, refined, sophisticated and complex sweetness without giving any adverse effect on the taste or a flavor of the products and to import to the products characteristics such as those which will inhibit the absorbance of sucrose in the digestive tract and will prevent the so-called sugar harms caused by the excess intake of sucrose, In the case of adults, arteriosclerosis and hypertension are regarded as being attributable to the excessive intake of sugars, which forms cholesterol in blood. An objective of the present invention is to provide a sweetener for adults or such patients without fear of inducing or aggravating such diseases.

The present invention will be illustrated further in reference to the following experiments which demonstrate the remarkable efficacies of maltitol and/or lactitol in comparison with sucrose. All percentages and parts are given in weight/weight unless stated otherwise.

Groups of Wistar-derived albino rats were fed individually for 2 months one of the following diets: standard diet (A), (potato starch 55 parts, casein 20 parts, vegetable oil 10 parts, alfalfa 10 part, vitamins 1 parts and minerals 4 parts), diets wherein 10 parts of starch were replaced with an equivalent amount of either sucrose (a diet hereinafter referred to as $A_S$), maltitol (a diet hereinafter referred to as $B_M$), or lactitol (a diet hereinafter referred to as $B_L$) and diets wherein 10 parts of starch were replaced with an equivalent amount of either maltitol or lactitol but to which were added, in addition, 10 parts of sucrose (diets referred to hereinafter as $C_{SM}$ and $C_{SL}$). The compositions of the above diets are listed in the Table 1.

TABLE I

| | Diet Composition (in parts) | | | | | |
|---|---|---|---|---|---|---|
| | Standard Diet (A) | Sucrose Diet ($A_S$) | Maltitol Diet ($B_M$) | Maltitol and Sucrose Diet ($C_{SM}$) | Lactitol Diet ($B_L$) | Lactitol and Sucrose Diet ($C_{SL}$) |
| Potato Starch | 55 | 45 | 45 | 45 | 45 | 45 |
| Casein | 20 | 20 | 20 | 20 | 20 | 20 |
| Vegetable Oil | 10 | 10 | 10 | 10 | 10 | 10 |
| Alfalfa | 10 | 10 | 10 | 10 | 10 | 10 |
| Vitamins | 1 | 1 | 1 | 1 | 1 | 1 |
| Minerals | 4 | 4 | 4 | 4 | 4 | 4 |
| Sucrose | — | 10 | — | 10* | — | 10* |
| Maltitol | — | — | 10 | 10 | — | — |
| Lactitol | — | — | — | — | 10 | 10 |

*"Sucrose 10 parts" means that it was added, additionally, to an equivalent amount of either maltitol or lactitol.

No significant difference was observed in body weight among the groups fed standard diet (A), lactitol diet ($B_L$) and maltitol diet ($B_M$). The variations in body weight on feeding the feeding diets prepared by replacing a portion of starch with maltitol or lactitol in accordance with the procedure described above are illustrated in FIG. 1, wherein the ordinate expresses the rat body weight in gram, the abscissa the feeding test periods in weeks, and curves a, b and c represent, respectively, the body weight gains of standard diet (A) group, maltitol diet ($B_M$) group and lactitol diet ($B_L$) group.

In comparison to the above results, administration of 1 ml of a 10% sucrose solution, 2ml of a 10% sucrose-maltitol solution (1:1), or 2 ml of a 10% sucrose-lactitol solution (1:1) to fasted rats displayed a great difference in blood glucose values. Whereas the administration of the sucrose solution gave a sharp rise in blood glucose value within 60 minutes, 50 mg to 230 mg/dl, the blood glucose value following administration of either the sucrose-maltitol solution or sucrose-lactitol solution retained at a level about half in comparison to that obtained by the sucrose administration. Curves a, b, c and d show the variations in blood glucose value after individual administration of 10% solutions of glucose, sucrose, sucrose-maltitol and sucrose-lactitol to fasted rats. The ordinate expresses blood glucose value as mg/dl and the abscissa represents the time lapse after the administration in minutes. The vertical lines (I) represent the scattering for each curve.

Figure 3:
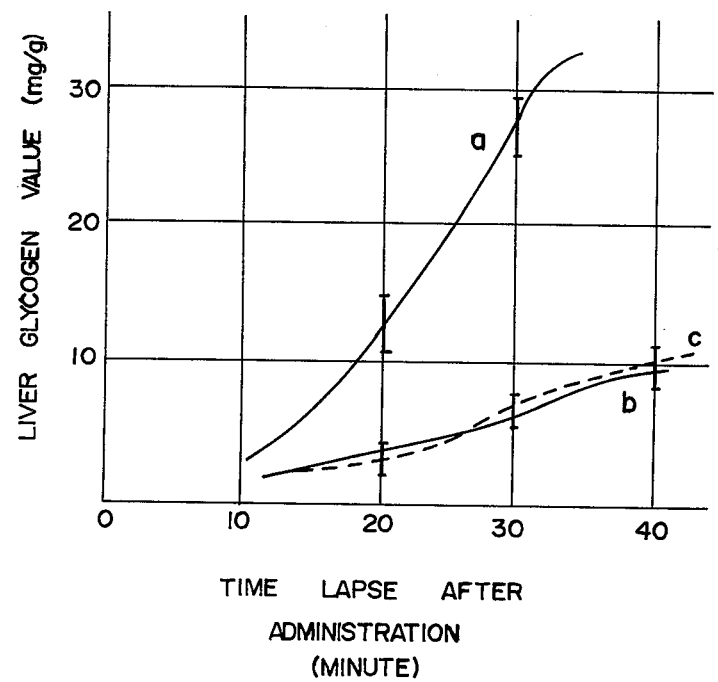

Determination of the variation in liver glycogen value carried out over a period of 30 to 40 minutes resulted in a 30 to 35 mg/g increase after an administration of a 10% sucrose solution, whereas the increase following an administration of either a 10% sucrose-maltitol (1:1) or sucrose-lactitol (1:1) solution gave an increase of merely about one fifth to one sixth in comparison with that of the sucrose administration. In FIG. 3 are illustrated the variations in liver glycogen values after individual administration of 10% sucrose, 10% sucrose-maltitol and 10% sucrose-lactitol solutions to fasted rats wherein curves a, b and c represent the results in the given order. The ordinate represents the mg liver glycogen against gram fresh liver tissue, the abscissa the time lapse after administration in minute and the vertical lines (I) represent scattering of each curve.

Furthermore, absorbance tests were performed on sucrose using intestinal tracts of rats. Three zones were prepared, namely a one w/v% sucrose solution, a 0.05 w/v% vitamin mixture (vitamin $B_1$, biotin and vitamin $B_6$) and a 0.1 w/v% amino acid mixture (glutamic acid, methionine and tryptophan), to which were added either a 1 w/v% anhydrate maltitol solution or a 1 w/v% anhydrate lactitol solution to give a total of six test zones.

The effects of maltitol and lactitol on the absorbances of sucrose, vitamins and amino acids were investigated with the test zones. Each of the test zones were dissolved in Krebs-Ringer's buffer solution. The absorbances of the test zones by the intestinal tract were studied by immersing inverted tracts in each of the zones. The finding showed that the presence of either maltitol or lactitol do not effect absorbance of vitamins or amino acids. Whereas over 2 μMol of sucrose permeated within 15 minutes, the absorbed sucrose declined to less than 0.3 μMol in the presence of maltitol or lactitol. The observation suggests inhibition effects of maltitol and lactitol on the absorbance of sucrose.

Additionally, the effects of maltitol and lactitol on the absorbance of free cholesterol were investigated with rats.

Twelve diets were fed to the rats; the standard diet, a diet which is obtained by adding 1% of cholesterol to the standard diet, a diet prepared by replacing starch with 10% of maltitol against the standard diet and adding 1% of cholesterol, a diet prepared by replacing starch with 10% of lactitol similarly as the above cholesterol-maltitol diet, a diet prepared by replacing a portion of the starch compositions of the standard diet with equivalent amounts of maltitol and lactitol (5% each) and then adding 1% of cholesterol, a diet prepared by replacing a portion of starch with sucrose in an amount of 10% against the standard diet, six diets prepared by adding additionally 10%, 5%, 1% of either maltitol or lactitol to the 10% sucrose diet described above, and the serum free-cholesterol (mg/dl), total cholesterol (mg/dl) and the total cholesterol in liver (mg/100g fresh liver) were determined. The serum free-cholesterol, total cholesterol and total liver cholesterol after administration of the standard diet were about 18, about 80 and about 255 respectively, whereas the administrations of the sucrose-added diet gave about 55, about 115 and about 550 which range from about two to three times in comparison to the values obtained with standard diet. The sucrose-maltitol, 1:1–0.1, and sucrose-/lactitol, 1:1–0.1, diets resulted in cholesterol values in the range from 100% to 50% of the values obtained with standard diet. The above findings show distinctly the effect of adding maltitol and/or lactitol on inhibiting formation of cholesterol.

When diets prepared by replacing a portion of the starch component of the standard diet with maltitol or lactitol in an amount of 5% and 10% of the whole diet and then adding additionally 1% of cholesterol were fed to hypercholesterinemia rats induced by administration of cholesterol-added diet, the total serum cholesterol and total liver cholesterol values declined to a range from ⅓ to ½. More particularly, the serum free-cholesterol, total serum cholesterol and total liver cholesterol values of the cholesterol rats declined with the administration of maltitol or lactitol added diet from about 125 to 50, from 325 to 125, and from 1600 to 700, respectively. The concentration of maltitol or lactitol that decreases the cholesterol values does not seem strictly critical. The results are listed in Table II.

TABLE II

Effects of Maltitol and Lactitol on Serum Cholesterol and Liver Cholesterol

| | S.F.C., mg/dl | T.S.C., mg/dl | L.C., mg/100 g tissue |
|---|---|---|---|
| Standard Diet | 18–19 | 75–85 | 250–260 |
| Sucrose (10%) | 50–60 | 110–120 | 500–600 |
| Cholesterol (1%) | 120–130 | 300–350 | 1,500–1,700 |
| Cholesterol + Maltitol (10%) | 45–55 | 120–130 | 720–750 |
| Cholesterol + Maltitol (5%) | 45–50 | 120–130 | 650–700 |
| Cholesterol + Lactitol (10%) | 50–58 | 130–140 | 780–790 |
| Cholesterol + Lactitol (5%) | 50–56 | 130–150 | 700–720 |

S.F.C = Serum Free Cholesterol
T.S.C. = Total Serum Cholesterol
L.C. = Liver Cholesterol The fact that administration of diets to which are added maltitol or lactitol in a small amount inhibits the absorbance of cholesterol and retains cholesterol values in a normal range is apparent from the above results. Moreover, hardly any significant difference was observed in the efficacies of maltitol and lactitol.

As the above experiments distinctly show, the addition of maltitol and/or lactitol to sucrose-containing sweetener or sucrose-containing foods and drinks inhibits the absorbance of the ingredient sucrose, thus giving the products low-calorie characteristics and, moreover, eliminating the fear of causing the so-called sugar harms. Furthermore, the addition of maltitol and/or lactitol to cholesterol-containing foods and drinks inhibits absorbance of cholsterol, thus such foods will exhibit the same characteristic of inhibiting formation of cholesterol as in the cases of low-cholesterol foods, and therefore it is apparent that the present invention provides a process feasible for producing foods and drinks which adult or senile-disease patients can have without fear of increasing their cholesterol values.

Maltitol and lactitol which are employable in the present invention are sugar alcohols prepared by hydrogenating disaccharides, maltose and lactose, at neutral pH in the presence of Raney nickel and applying pressure. Maltose, used as starting material for maltitol, is prepared from starch with the co-action of isoamylase and beta-amylase and possesses a purity of 80 to 95% as maltose, the remainder being other saccharides such as maltotriose. Therefore the hydrogenation product from the maltose product will be a product with maltitol and maltotriitol as its main constituents and which will render difficulty in crystallization. As aqueous solution of such product will solidify into an non-crystallizable form upon concentration. Maltitol is extremely non-degradable by various amylases and is sweeter than maltose, thus is employable as a low-calorie sweetener, Lactitol is also a low-calorie sweetener with a somewhat lower sweetness compared to maltitol, but is available in crystalline powder form. The mixing rate of maltitol and/or lactitol solution to sucrose solution is freely-adjustable. A sucrose-maltitol and/or lactitol mixture solution with a high concentration up to 75% will not induce crystallization of either maltitol or lactitol as well as being effective in preventing crystalization of sucrose. Maltitol can be prepared into non-crystallizable powder when the application requires maltitol in a solid or powder form. Since lactitol crystallizes into a monohydrate crystal and does not impart hygroscopicity, lactitol can be incorporated or admixed into sucrose-containing sweeteners, foods and drinks. In addition, crystalline powder product of the admixture prepared by spray-drying such sucrose-lactitol mixture solution after concentration is very convenient for various uses.

As regards quality of sweetness, maltitol has an intensive sweetness which harmonizes desirably with that of sucrose. Needless to say, a mixture solution prepared with equivalent amounts of sucrose and maltitol will possess a calorie value about half of the value of sucrose solution of the same concentration due to the fact that maltitol itself is substantially non-digestable and non-metabolizable. Although lactitol has a sweetness somewhat lower than maltitol, it may be added to prepare sweeteners in which a sweetness of a lower level is desired. The use of such sweetener will adjust the sweetness of the food products in which the sweetener is used, as well as acting as a desirous body-rendering agent. Because lactitol is non-calorigenic, excess intake of the sweetener will not induce sugar harms.

With the utilization of the effects of maltitol and/or lactitol on inhibiting sucrose absorbance, non- or low-calorie sweeteners for cooking and table uses can be prepared with ease by admixing maltitol and/or lactitol, and, if preferable, spices, flavorings and coloring agents, to sucrose, Since maltitol is a sweetener with a high water-solubility it can be prepared into a mixture syrup with sucrose, owing to the non-crystallizability and crystallization-preventive property of maltitol. For example, when a powder sweetener such table-sugar i.e. sugar for use at the table and in cooking is required, the surface of maltitol granules may be coated with crystalline sucrose powder or membrane by the horizontal fluidized method or spray-drying method to compensate the relatively high hygroscopicity which renders difficulty in preparing maltitol per se into a long-lasting powder form and in addition to render a powdered sucrose-coated maltitol product with low adhesion, hygroscopicity and calorie value but an intensive sweetness.

Lactitol is a crystallizable substance with a relatively low sweetness. Sucrose-lactitol mixture solutions may be used as a consistent syrup with a lower sweetness. Spray-drying of the syrup will give a crystalline powder. A product obtained by applying a crystalline coating of the syrup on the surface of sucrose or lactitol granules by usual method such as spray- or fluidized-drying method can be used as a table sugar but with a lower calorie value. Needless to say, mixtures of sucrose crystal and lactitol crystal may also be used as table sugar.

Since mixtures of sucrose and maltitol and/or lactitol vary in their sweetness and crystallinity, a number of low-calorie food and drink specialties may be prepared with ease by varying the mixing ratio of the constituents. Mixtures of sucrose and maltitol of various mixing ratio are highly sweet, non-crystallizable, lower in calorie value in comparison with the sole employment of sucrose and renders difficulty in crystallization. Based on these outstanding properties, the mixtures are suitable for processing foods with a high content of sucrose, such as hard candies, jams, preserves, jellies, caramel, sponge- and pound-cakes, and sweetened condensed milk. Such foods are more desirable in regards their sweetness quality, much lower in calorie vlaue in comparison with those in which only sucrose is used as sweetener and moreover the foods are those which inhibit absorbance of cholesterol.

The efficacies provided by the addition of maltitol and/or lactitol to foods were entirely unpredicated from conventional foods and drinks. While crystalline sucrose-lactitol mixtures are water-soluble, they render some difficulty in dissolution in comparison with equivalent crystalline sucrose-maltitol mixtures. Therefore the sucrose-lactitol mixtures are suitable for applications where a sweetener with a body of lower sweetness and in crystalline powdered form are desirable. Particularly, the mixtures are suitable ingredients for preparing chocolates, especially black chocolates which require a mild sweetness as well as body. In addition, sugar-harm-prevention effectiveness and physiological efficacies, such as low-calorigenic and low-cholesterol-inducing efficacies, can be expected from foods and drinks in which the sucrose-lactitol mixtures are incorporated. The mixtures are also suitable for instant soups, instant coffee and instant teas since they impart to the products a well-harmonized mild sweetness and a desirous body. Further, the lactitol-containing sweeteners are expected to serve as essential ingredients to develop a number of new food and drink specialties to which are imparted low-calorigenicity and non-cholesterol absorbency. The above efficacies were unpredicable from conventional foods and drinks wherein only sucrose is used as sweetener. Other foods and drinks wherein a mild sweetness is desirable and wherein the use of the sucrose-lactitol sweetener mixtures lead to especially satisfactory results include frozen desserts, such as ice creams and sherbets, carbonated beverages, lactic beverages, dairy beverages, refreshing drinks, baked products, such as breads, rolls, cookies, biscuits, pastries, and confectioneries.

As described above, the mere simultaneous use of maltitol and/or lactitol with sucrose will decrease calorie intake and inhibit absorbance of cholesterol much more than in the cases when only sucrose is used. Additionally, the use of such sweeteners, sucrose-maltitol and/or lactitol mixtures will lower the calorie values of foods and drinks, as well as improving the sweetness quality, taste and flavor of the food products.

The present invention will now be further described in detail by means of a series of exemplary demonstrations thereof.

Example 1

Preparation of a sweet syrup which is intended as table syrup.

Maltitol, purity 90%, or lactitol is added to sucrose in amounts of 10%, 50% and 100% based on sucrose to give 75% solid syrups. The sucrose 1:maltitol 1 or sucrose 1:lactitol 1 syrup is consistently viscous and does not crystallize even when allowed to stand at 10°C. The sucrose-maltitol syrup (1:1) has a sweetness of about 80–90% compared to that of sucrose, but as regards quality of sweetness it is more desirable and palatable than sucrose. The sweetness of the sucrose-lactitol syrup (1:1) is somewhat weaker that of the above sucrose-maltitol syrup, about 60–70% in comparison with sucrose, but is a sophisticated, decent, mild sweetness suitable for use as table syrup. The sweetening syrups can be prepared with ease into a variety of desirable table syrups with the addition of coloring- or flavoring-agents.

No matter what the mixing ratio of sucrose versus maltitol and/or lactitol was, the efficacy of inhibiting sucrose absorbance was remarkable. Particularly, the increase of bloodglucose value remained less than one third of that obtained with sucrose.

Example 2

Preparation of a table sugar 2-a.

To sucrose is admixed thoroughly a powdered crystalline lactitol in an amount of 10–80% against sucrose and then the mixture is packed in small packages in 10 to 20 gram segments for sweetening coffee, black tea and other foods and drinks.

The sweetener inhibits sucrose absorbance in vivo and not only that it is nearly non-calorigenic it softens the intensive, stimulative, excessive sweetness of sucrose.

2-b.

A mixture of lactitol in fine powder, from 100 to 50 mesh, and air, in a mixing ratio of 10–20%, v/v, is injected from the center nozzle of a two-fluid nozzle attached on the top of a spray-drying tower. Separately, a 75% aqueous sucrose solution which is cooled gradually with agitation and which is beginning to crystallize is sprayed through the outer nozzle applying a pressure of 50 to 100 kg/cm$^2$ to allow the sprayed solution to contact with powderd lactitol and then the mixture is dried with hot air charged from the top of the drying tower. Alternatively, a sucrose solution as described above may be sprayed on a horizontal fluidized-bed of lactitol fine powder, and the lactitol powder and the sucrose drops may be dried as a whole to obtain a crystalline sucrose-lactitol product. The mixing ratio of sucrose and lactitol is adjusted to meet the degree required for the product as table sugar.

2-c.

An adhesive powder is obtained by spray-drying a 75% aqueous maltitol solution in a drying tower. The powder is dropped on a powder sucrose layer kept in a fluidized state on the bed of the drying tower to sugar-coat the maltitol powder. The mixing ratio of the sucrose-maltitol product may be in the range of 10–100%, based on sucrose. By coating the non-crystallizable maltitol with crystallizable, non-hygroscopic sucrose gives a non-hygroscopic product which is easy to handle during subsequent processing in which the sweetener is to be used.

The sucrose-maltitol product is in a rather large granular form which has no fear of dusting and is feasible for use at the table, cooking or for commercial uses in large quantities.

In addition, there is no fear of separation of the product into two components and it may be used as a low-calorie sweetener which maintains its constant quality.

Example 3

Preparation of an orange juice.
Ingredients:

| | |
|---|---|
| A fruit juice concentrated to one fifth of its original volume | 1,000 gr. |
| Citric acid | 170 gr. |
| Flavoring agents | sufficient amount |
| Coloring agents | sufficient amount |
| Sucrose | 500 gr. |
| Maltitol | 400 gr. |

To a mixture of the above ingredients is added a sufficient amount of water to yield a product of 50,000 gr.. The product possesses a viscosity more desirable than a similar product in which only sucrose is used as sweetener and is a product which hardly effects absorbance of sucrose and which posseesses a mild and softly harmonized sweetness. The oligosaccharides in the ingredient maltitol acts as a dispersing agent, flavor- and color-stabilizer and is effective in maintaining constantly the homogeneous quality of the product, as well as retaining the original characteristics of natural fruit juice.

Example 4

Preparation of an orange juice.

An orange juice product was prepared with the same ingredients as described in Example 3 with the exception that maltitol was replaced with lactitol or lactitol was added to the ingredients. The employment of lactitol in either case resulted in satisfactory products. Especially, replacement of 50% of the maltitol ingredient with lactitol gave very desirable results.

In an orange juice product wherein such replacement was made, the maltitol component inhibited the crystallizabilities of sucrose and lactitol during a storage test conducted with a juice product concentrated to one fourth to one fifth of its original volume.

Example 5

Preparation of a powdered juice.

To 100 parts of a sifted sucrose powder was added three parts of citric acid, one part of tartaric acid, 0.1 part of sodium glutamate, 1.5 parts of powdered flavor, 50 parts of lactitol powder and a sufficient amount of coloring agents.

After admixing the above ingredients thoroughly, the mixture solution was spray-dried and sifted to give a powdered juice product. Incorporation of lactitol improves the water-solubility and prevents deterioration of the resulting product, as well as inhibiting absorbance of sucrose, thus rendering the product a nearly non-calorigenecity. Since excessive addition of lactitol will increase the viscosity of the product and may cause turbidity, it is preferable to keep the incorporation within 50% against sucrose.

Example 6

Preparation of carbonated drinks.

Ingredients to prepare 18 liters of cider is given as a typical formulation of carbonated drinks.

| | |
|---|---|
| Sucrose | 1.5 kg. |
| Saccharin sodium | 15 gr. |
| Table salt | 5 gr. |
| Citric acid | 110 gr. |

| Flavoring | 100 gr. |

A mixture solution prepared by dissolving the above ingredients thoroughly is filtered, carbonated and then bottled according to usual method. Replacement of saccharin sodium with 0.3 to 0.5 kg of maltitol will result in a product with a very satisfactory flavor and sweetness.

In case a product with a bland sweetness is desirable, the addition of about 0.3 kg of lactitol instead of maltitol will impart a pleasant, bland and non-excessive sweetness to the product. The beverages in which maltitol and/or lactitol is incorporated possess a pleasant taste, flavor and a satisfactory after-taste and are, additionally, high-quality beverage specialties which are nearly non-calorigenic.

Example 7

Preparation of a lactic beverage.

100 ml of skim milk is sterilized by heating at 80°C for 20 minutes, cooled to 40°C and then 3 liters of a culture broth of Lactobaccilus bulgaricus is added as a starter. The mixture is then allowed to ferment at 37°C to give an acidity of 1.4, which takes about 10 hours. Thereafter the casein content is dispersed thoroughly with a homogenizer and then to the resultant is added 100 to 150 kg sucrose and 50 to 100 kg maltitol. At this stage it is preferable to adjust the sweetness to the desired degree by varying the amount of maltitol added. Then the product is sterilized by heating at 80°C for 20 minutes, filtered, and cooled, a suitable amount of flavor is added and the product is then bottled. The characteristics of the product are as follows. It is recommendable as a beverage for adults. More particularly, the sweetness of maltitol softens the excessive sweetnes of sucrose, and imparts to the whole product a mild sweetness.

The addition of maltitol also increases the viscosity of the product. The maltotriitol content in the ingredient maltitol is effective in inhibiting separation and precipitation of the casein content and in retaining the desirable taste and flavor of the product for prolonged periods.

Although the product has a high sucrose content it is low calorigenic.

Example 8

Preparation of a cola-drink.

In an aqueous sucrose solution prepared with 20 kg sucrose and 19 kg water is dissolved 10 kg of maltitol. Thereafter, to the resultant are added 1.2 liter caramel, 90 ml phosphoric acid syrup, 37 gr caffein, 45 ml coca leaf extract, 75 ml cola fruit extract, 470 ml alcohol, 150 ml vanilla extract, 480 ml lime juice and 120 ml of a cola flavor prepared by dissolving lemon oil, sweet orange oil, cinnamon oil and coriander oil in alcohol, (95 v/v%), and the mixture solution is allowed to age for 3 to 4 days. A given amount of the aged solution is transferred to a bottle and the bottle is sealed after charging therein sufficiently cooled carbonated-water.

The efficiency of adding maltitol is displayed by improving the cola flavor itself, lowering the calorigenicity of sucrose and providing a nearly non-caloric drink.

Example 9

Canned peaches.

Ripe yellow peaches peeled by usual methods are immersed in a 0.05% erythrosine solution for 15 minutes to colorize the sarcocarp sufficiently. During the process the pH of the solution is maintained at 4.0. Then the sarcocarp is washed with cold water to remove therefrom excessive color. After placing the sarcocarp in tin cans a 35% sucrose-maltitol system (2:1) is charged therein. The cans are degassed, seam-sealed and sterilized at 100°C. When opened after 3 month storage, the products showed a improved yield of solids, no disintegration of sarcocarp, a more improved gloss due to the addition of maltitol, an excellently harmonized sweetness of the sweetener and that originating from the fresh peaches, and a sweetness much more superior in comparison with that of a product in which only sucrose is used. The absorbance of the sucrose content is inhibited by the ingredient maltitol, thus the process provides a real low-calorie canned fruit product. In the case of canned fruit, the mixing ratio of maltitol may be adjusted depending on the sweetness and acidic taste of the fruit sarcocarps. A canned fruit product in which the original acidic taste of sarcocarp is maintained and which possesses a mild, pleasant sweetness, desirous gloss and appreciable solution viscosity is provided by adding 20–50% of lactitol against sucrose.

Example 10

Preparation of sweetened powdered milk.

Material milk with an adjusted fat content is purified by passing it through a clarifier. Separately, a sucrose-maltitol system (5:1) in an amount of 4% against total material milk is dissolved with a small portion of the material milk. The mixture solution is added to the material milk just before its completion of concentration. The concentration is carried out under reduced pressure and low temperature conditions to a concentration of about 50% and then the resultant is spray dried.

The powder milk exhibits a mild sweetness, does not effect moisture absorbance or caking, and possesses a low-calorigencity close to that of unsweetened powdered milk.

Example 11

Preparation of sweetened condensed milk.

Material milk with an adjusted fat content is flash-pasteurized, pre-concentrated and a sucrose-maltitol sweetener (solid mixing ratio, 2:1) in an amount of 15–20% based on material milk is added. The resultant mixture solution is then concentrated, cooled to not higher than 15°C and treated so as to pulverize the lactose crystals. The maltitol content of the sweetener displays its efficacy in preventing sucrose crystallization, in maintaining lactose crystallization to minimum and in pulverizing the lactose crystals. A typical formulation is as follows.

| Water | 25% |
| Whole milk anhydride | 29% |
| Fat | 7% |
| Protein | 7% |
| Lactose | 13% |
| Ash | 1.5% |
| Sucrose | 30% |

| -continued | |
|---|---|
| Maltitol | 15% |

The condensed milk product hs a slight yellowish gloss and desirous viscosity. Its fat content is dispersed satisfactorily and lactose crystals are pulverized. The product has a pleasant, desirous mouth-touching property, a high solubility, a low-calorigenicity, a cholesterol-absorbance preventing efficacy and is suitable for adults.

Example 12

Preparation of a powdered instant coffee.

In case an instant coffee with an intensive sweetness is desired, a sucrose-maltitol sweetener (2:1 to 5:1) is incorporated in an amount which exhibits a sweetness degree equivalent to that attained with the commonly added amount of sucrose, while an instant coffee with a moderate, mild sweetness and desirous body is attainable with the addition of a sucrose-lactitol sweetener (5:2 to 5:1). Instant coffee sweetened with the sweetener in accordance with the present invention may be prepared by usual methods, a typical formulation of which is as follows. A coffee extract solution is concentrated at low temperature and reduced pressure to a 30% concentration. Thereafter the above described sweetener mixture is added thereto in an amount of 50–100% against the concentrated extract solids and then concentrated again to 50% at a temperature lower than 50°C.

The mixture is prepared into a granular form by freeze-drying. According to the present invention, in the instant coffee lactitol exhibits its mild sweetness desirously, is effective in retaining the true natural flavor of coffee and renders easiness in the drying and granulation procedures.

Needless to say, the product has a satisfactory water-solubility, low calorigenicity and a cholesterol-absorbance inhibiting effect.

Example 13

Instant soup

The sucrose-lactitol sweetener according to the present invention is suitable as a low-calorie sweetener in the production of instant soup. Particularly, the sweetener imparts to the product a extermely bland, decent, moderate sweetness, a desirous body to the powdered product and desirous viscosity to the product when dissolved for final use.

Instant coffee may be prepared by usual method, the following ingredients consisting an embodiment Corn starch 10 parts, beef extract 5 parts, concentrated vegetable juice 7 parts, powdered milk 10 parts, table salt 3 parts, sucrose-lactitol sweetener 5 parts seasoning 1.5 parts, powdered vegetable 2 parts, butter 4 parts and sufficient amounts of spices and flavors. The ingredients with high moisture contents are first concentrated to 50% under reduced pressure conditions. After adding thereto 5 parts of the sweetener powder, the rest of the ingredients, butter, powdered vegetable and a small amount of sugar ester, are added. Then the mixture is stirred thoroughly, homogenized and spray dried.

The moisture content of the product is maintained at 5% or less. The product is non-hygroscopic and highly water-soluble.

Example 14

Preparation of baked products.

The sweeteners according to the present invention, especially the sucrose-maltitol mixture sweetener, are feasible and suitable for the production of baked products, such as breads, rolls, buns, pastries, etc., and they are effective in reducing the calorie values of the products by the presence of unferemented sugars, and the products in which are incorporated maltitol and/or lactitol are expected to find many useful applications as food specialities. The moisture retention characteristic of the sweetener are effective in improving the inner phase of bakery products, which is realized by the co-existence of sucrose, prolonging the shelf lives of such products by several times, and also in preventing formation of fungi and molds to a considerable extent. The bread may be prepaped as follows. Flour 100 parts, bakery yeast 2 parts, the above mentioned sweetener 5 parts, inorganic foods 0.1 part are mixed and kneaded while keeping the moisture to less than 60%. The dough is allowed to ferment by the so-called "sponge dough method" maintaining the fermentation period 2 hours at 20°C, aging period of 15 minutes and allowing bench-time of 15 minutes. Thereafter the dough is baked for 35 minutes. No difference was observed in the hue of the bread in comparison with those in which sucrose is used and its sponge shape was also satisfactory. Endurance test is measured with a compression meter. The result showed 50% increases in storage- and shelf-lives on storage tests.

The sweetener was also used in an amount of over 15% in the production of sweetened buns, rolls and baked confectioneries. The employment of the sweetener resulted in imparting to the products a satisfactory sweetness and exhibiting fully the required characteristics for such products.

Example 15

Preparation of biscuits.

The preparation of biscuits will be illustrated as an embodiment of baked confectionery. Replacement of the sucrose ingredient which is commonly used for biscuits with the sucrose-maltitol sweetener according to the present invention will impart a mild, moderate, bland and decent sweetness, a desirable gloss, luster to the product and will prolong the storage-and shelf-lives of the products. In addition the employment of maltitol results in imparting to the products a satisfactory texture and structure to soft-type biscuits. A typical example of ingredients for soft-type biscuits are as follows, in parts.

| | |
|---|---|
| Flour, thin-boiling type | 100 |
| Starch | 5 |
| Sucrose-maltitol sweetener (2:1) | 45 |
| Condensed milk | 5 |
| Butter | 10 |
| Shortening oil | 15 |
| Egg | 10 |
| Table salt | 0.5 |
| Baking powder | 0.5 |

As shown in the above list of ingredients, the efficacies such as moisture retention and prevention or occurence of irregularly shaped products can be fully realized with the addition of maltitol even though the addition of starch syrup is ommitted. A soft-type biscuit without an unusual increase in sweetness, but with a low calorigenicity, and homogenized inner texture is thus attainable. Firstly, to the above ingredients is added water and the mixture is mixed in a kneader, minimizing the kneading time as far as possible to maintain the dough at a softness that it is passable through a cutter. The dough is then applied on a shaping machine and then spread on a baking pan. The dough is baked in a band-oven keeping the temperatures of the entrance and exit thereof at about 250°C and 130°C, respectively, and adjusting the residing time so that the desired baked color is imparted to the product. After gradual cooling the product is packed. The product was of regular shape, dissolved in the mouth with ease and had a homogeneous smoothness.

Example 16

Preparation of jams.

The employable amount of sucrose in preparing jams depends critically on the final concentration of the jam product (2:1). However, a replacement of sucrose with the sucrose-maltitol sweetener prepared according to the present invention as sweetener provides a sufficient and superior sweetness, enhances the natural flavor of the material strawberries and also provides low-caloric jams. In an embodiment, after removal of calyces, choice, fresh, ripe Victorian strawberries are water-washed and then removed of water by placing them in a basket. 15 kg of the berries with a sugar content of 7% are cooked in a jacket-type cooker and then the sweetener of the invention is added in an amount of 4.65 kg, d.s.b., and concentrated to bring the concentration of the final product to 30% and the final acidity to 0.45%. The concentration time is minimized by continuous stirring. After 30 minutes concentration the product is freed from foam and then packed in No. 5 cans. Immediately, the cans are seam-sealed, turned upside down, sterilized by 20 minutes of heating and cooled. The product shows no deterioration or change in shape. The sweetener is well permeated in the product. Thus a low-calorigenic jam with satisfactory color and flavor retention properties are attainable by usual methods.

Example 17

Preparation of chewing gum.

Twenty parts of gum base is admixed with 80 parts of the present sucrose-lactitol sweetener (2:1) and sufficient amounts of flavoring and coloring agents. First, 20 parts of gum base is dissolved by heating and then 80 parts of the present sucrose-lactitol sweetener powder (2:1) and sufficient amounts of coloring- and flavoring-agents are added thereto. Then the mixture is kneaded with a roller-type kneader, shaped as required and allowed to dry overnight. In the chewing gum the sucrose sweetness is adjusted appropriately, mildly and satisfactorily, imparting to the product a long-lasting sweetness, thus providing a real low-caloric sweet confectionery. The producibility and handleability of the product are excellent also there is no fear of variation of hardness due to temperature changes.

Example 18

Preparation of a chocolate with a relatively low sweetness.

A mixture comprising 40 parts cacao paste, 10 parts cacao butter, and 50 parts of the present sucrose-lactitol sweetener powder (2:1) is passed through a refiner. Thereafter the resultant is placed in a conche where it is kneaded up for 2 to 3 days. If preferable, 0.5 parts of lecitin is added thereto during the procedure. Before solidification of the butter, the resultant is shaped by casting. After degassing with the employment of a vibrator, the resultant is passed into a cooling chamber kept at 10°C maintaining the residing period for 20 minutes to solidify the product. The product has a mild, bland, pleasant sweetness, is a product in which the natural bitterness of chocolate is displayed satisfactorily and which is a food specialty with low-caloric and low-cholesterol efficacies. The product has, in addition, a high viscosity, desirable mouth-touching and biting properties, and a high smooth solubility.

Example 19

Preparation of ice cream.

The refreshingly sweet and low-calorie sucrose-maltitol sweetener (1:1) of the present invention is generaly suitable for preparing frozen desserts, a typical embodiment of which is as follows.

| | |
|---|---|
| 40% cream | 20 kg |
| Sweetened condensed milk | 20 kg |
| Whole milk | 49 l |
| Skim powder milk | 2 kg |
| Sucrose-maltitol sweetener (1:1) powder | 6.5 kg |
| Stabilizer | 0.3 kg |
| Monoglyceride | 0.3 kg |
| Egg yolk | 2 kg |
| Total | 100 kg |

The employment of the above ingredients will give a high-fat containing, high quality ice cream. The replacement of the commonly used sucrose with the present sucrose-maltitol sweetener, as described above, will increase the maltitol content which will in turn inhibit the absorbance of sucrose including that of the sucrose originally present in the ingredient diary products and thus will enhance the efficacies of the low calorigenic ice cream. The ice cream can be prepared by usual methods, an example of which is as follows. Skim powder milk is dissolved thorougly in warmed whole milk. After mixing the stabilizer with the sucrose-maltitol powder, the mixture is dissolved in a portion of the above milk mixture with heating, and then monoglyceride is dissolved in the resultant. To the mixture solution are added the remaining ingredients and the resulting mixture is sterilized by heating at 66° to 75°C for 30 minutes, which is immediately homogenized, cooled rapidly and allowed age at 3° to 4°C overnight. Then the resultant is treated with a freezer. The frozed ice cream taken out of the freezer is stored in a solidification chamber kept at −15° to −20°C. In comparison to the products in which sucrose is the sole sweetener, the product has a much smoother and finer texture, a more desirous structure, improved mouth-touching properties, a more appealing appearance and, in addition, is more palatable. The invention provides a process for high quality ice cream with a high over-run property. Moereover, the sweetness of product is one that gives a refreshing, pleasant effect required for quality ice cream, as well as the product being a frozen dessert specialty characterized in being low-calorigenic and low-cholesterol inducing.

What is claimed is:

1. A method for lowering the cholesterol absorbance of a person in need of such treatment comprising feeding to said person a cholesterol-containing food or drink in which maltitol ot lactitol is present in an amount sufficient to inhibit the absorbance of cholesterol in the human body, thereby inhibiting the increase in the blood and liver cholesterol levels in said person caused by the cholesterol in said food or drink being fed.

2. A method in accordance with claim 1 wherein said person in need of such treatment is a person with hypercholesterinemia.

3. A method for inhibiting the increase in blood and liver cholesterol levels incurred upon the ingestion of sucrose in a person with a disease induced or aggrevated by excess blood cholesterol or liver cholesterol levels comprising feeding to said person a food or drink in which maltitol or lactitol is present, in addition to sucrose, in an amount sufficient to inhibit the absorbance of sucrose in the digestive tract, thereby inhibiting the blood or liver cholesterol level increases caused by such sucrose.

4. A method in accordance with claim 3 wherein said maltitol or lactitol is present from 10 to 100% against said sucrose.

5. A method in accordance with claim 3 wherein said person in need of such treatment is a person with arteriosclerosis.

6. A method in accordance with claim 3 wherein said person in need of such treatment is a person with hypertension.

* * * * *